United States Patent
Sasahara et al.

(10) Patent No.: US 8,468,367 B2
(45) Date of Patent: Jun. 18, 2013

(54) STORAGE APPARATUS AND AUTHENTICATION METHOD

(75) Inventors: Tatsuya Sasahara, Minato-ku (JP); Hideaki Takahashi, Minato-ku (JP); Toru Furuta, Minato-ku (JP); Kinya Saito, Kawasaki (JP); Shinobu Sasaki, Kawasaki (JP); Daisuke Tomii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 488 days.

(21) Appl. No.: 12/662,585

(22) Filed: Apr. 23, 2010

(65) Prior Publication Data
US 2010/0306555 A1     Dec. 2, 2010

(30) Foreign Application Priority Data
May 29, 2009    (JP) .................. 2009-130811

(51) Int. Cl.
*G06F 21/00*     (2006.01)

(52) U.S. Cl.
USPC ........................................ 713/193; 380/279

(58) Field of Classification Search
USPC .................................... 713/193; 380/279, 30
See application file for complete search history.

(56) References Cited

U.S. PATENT DOCUMENTS

2005/0144354 A1*   6/2005   Murashita .................... 711/100
2008/0092240 A1*   4/2008   Sitrick et al. ................... 726/27

FOREIGN PATENT DOCUMENTS

JP     2007-286935     11/2007

OTHER PUBLICATIONS

Minoru Matsumoto, A Study of Authentication Method on Fixed Mobile Convergence Environments,Telecommunications Network Strategy and Planning Symposium, 2006. Networks 2006. 12th International, IEEE, Date of Conference: Nov. 2006, pp. 1-6.*

* cited by examiner

*Primary Examiner* — Michael Simitoski
*Assistant Examiner* — Ali Shayanfar
(74) *Attorney, Agent, or Firm* — Staas & Halsey LLP

(57) ABSTRACT

A storage apparatus includes a key control part to judge a validity of a data access from a request source based on authorization information received therefrom and authorization information created from an enciphering key included in enciphering key information received from a key management apparatus, and a control part to make the data access to the recording medium using the enciphering key in response to an access request from the request source, if the validity of the data access is confirmed. The authorization information from the request source includes a unique code created from the enciphering key if an authentication is successful in the key management apparatus in response to an authentication request from the request source.

9 Claims, 8 Drawing Sheets

FIG.5

ENCIPHERING KEY INFORMATION

| NEXT POINTER |
|---|
| BACK POINTER |
| USER IDENTIFIER (ID) |
| ENCIPHERING KEY SPECIFYING INFORMATION |
| AUTHORIZATION INFORMATION |
| ENCIPHERING KEY DATA |

FIG.6

USER IDENTIFICATION INFORMATION

| NEXT POINTER |
|---|
| BACK POINTER |
| USER IDENTIFIER (ID) |
| AUTHORIZATION INFORMATION |
| WWN |

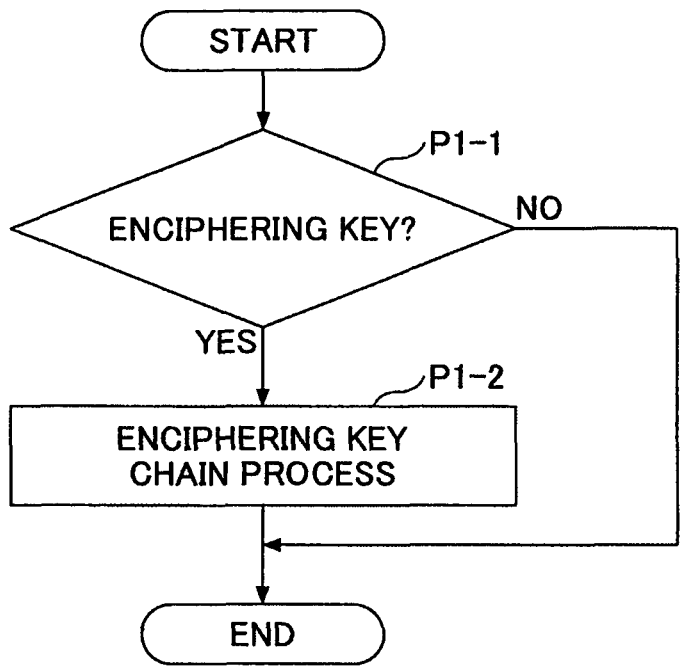
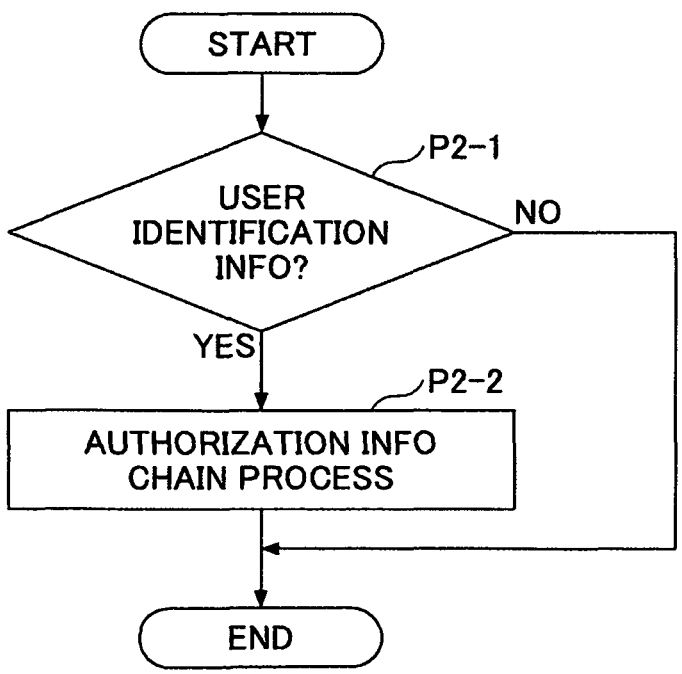

STORAGE APPARATUS AND AUTHENTICATION METHOD

CROSS-REFERENCE TO RELATED APPLICATIONS

This application is based upon and claims the benefit of priority of the prior Japanese Patent Application No. 2009-130811, filed on May 29, 2009, the entire contents of which are incorporated herein by reference.

FIELD

The present invention generally relates to storage apparatuses and authentication methods, and more particularly to a storage apparatus having an enciphering function and an authentication method for the storage apparatus.

BACKGROUND

FIG. 1 is a block diagram for explaining an example of a conventional storage apparatus. A storage apparatus 1 illustrated in FIG. 1 is formed by a library apparatus that uses magnetic tape cartridges 500, for example, and is connected to an enciphering key management server 3 via a control Local Area Network (LAN) 2. The storage apparatus 1 includes a drive control part 11 and a library control part 12. A plurality of office servers (or midrange servers) 4-1 and 4-2 (only 2 office servers illustrated) are connected to the enciphering key management server 3 via an office LAN 5, and are also connected to the storage apparatus 1 via a Fiber Channel Switch (FCS) 6. An application 41-1 that is executable in the office server 4-1 includes a front-end processing part 42 and a backup software 43. An application 41-2 that is executable in the office server 4-2 includes a front-end processing part (not illustrated) and a backup software (not illustrated), similarly to the application 41-1 of the office server 4-1.

The storage apparatus 1 has an enciphering (or encryption) function, and each of the office servers 4-1 and 4-2 can make data accesses using the enciphering function of the storage apparatus 1. In other words, each of the office servers 4-1 and 4-2 can make a data write access in which data to be written to the magnetic tape cartridge 500 within the storage apparatus 1 is enciphered based on an enciphering key before being written, and a data read access in which the data read from the magnetic tape cartridge 500 is deciphered (or decrypted) based on the enciphering key. The enciphering key management server 3 manages the enciphering key that is used for an enciphering process or a deciphering process within the storage apparatus 1.

A description will now be given of a case where the office server 4-1 makes the data access using the enciphering function of the storage apparatus 1. In a step ST1, the front-end processing part 42 of the application 41-1 makes an enciphering key delivery request to the enciphering key management server 3. In a step ST2, the enciphering key management server 3 authenticates the enciphering key delivery request from the application 41-1, and delivers the enciphering key to the drive control part 11 of the storage apparatus 1 if the authentication is successful. In a step ST3, the backup software 43 of the application 41-1 makes a load request with respect to the library control part 12 of the storage apparatus 1. In a step ST4, the backup software 43 makes a data path reserve request with respect to the drive control part 11 of the storage apparatus 1.

The library control part 12 of the storage apparatus 1 obtains the requested magnetic tape cartridge 500 from a rack (not illustrate) and loads the magnetic tape cartridge 500 into a drive part (not illustrated) in response to the load request. In addition, the drive control part 11 of the storage apparatus 1 registers the enciphering key to the drive part in response to the data path reserve request. Hence, the backup software 43 of the application 41-1 can thereafter encipher the data sent to the storage apparatus 1 using the registered enciphering key and write the enciphered data to the loaded magnetic tape cartridge 500. In addition, the backup software of the application 41-1 can read the enciphered data from the loaded magnetic tape cartridge 500 and decipher the read enciphered data using the registered enciphering key.

When the backup software 43 of the application 41-1 makes a data path release request (hereinafter simply referred to as a release request), the drive control part 11 of the storage apparatus 1 deletes the enciphered key registered in the drive control part 11. In addition, when the backup software of the application 41-1 makes an unload request, the library control part 12 of the storage apparatus 1 unloads the loaded magnetic tape cartridge 500 from the drive part and accommodates the unladed magnetic tape cartridge 500 within the rack.

In the conventional storage apparatus 1 described above, the setting of the enciphering key from the office server 4-1 in the step ST4, the data access from the office server 4-1, and the data access from the office server 4-2 are not synchronized to each other. For this reason, after the magnetic tape cartridge 500 is loaded into the drive part in the step ST3 based on the load request from the office server 4-1 and the enciphering key is registered in the drive part in the step ST4, even an apparatus other than the office server 4-1 that originally made the enciphering key delivery request, such as the office server 4-2, can make a data access with respect to the magnetic tape cartridge 500 that is loaded into the drive part using the enciphering key that is registered in the drive part, as indicated by a phantom arrow X1 in FIG. 1.

In other words, the data accesses from different apparatuses, such as the office servers, are not synchronized in the conventional storage apparatus having the enciphering function. As a result, if the storage apparatus is in a state where the enciphering key is registered within the storage apparatus in response to a request from an arbitrary apparatus, a data access using the registered enciphering key can be made in response to requests from other apparatuses, and it is difficult to secure security of the data.

The applicants are aware of a Japanese Laid-Open Patent Publication No. 2007-286935.

SUMMARY

Accordingly, it is an object in one aspect of the invention to provide a storage apparatus and an authentication method that can secure security of data.

According to one aspect of the present invention, there is provided a storage apparatus comprising a drive part to which a recording medium that is an access target is loaded, and from which the recording medium is unloaded; an enciphering key control part configured to confirm a validity of a data access from a request source apparatus based on authorization information that is received from the request source apparatus and authorization information that is created from an enciphering key included in enciphering key information received from an enciphering key management apparatus according to an arbitrary algorithm; and a control part configured to make the data access with respect to the recording medium that is loaded into the drive part using the enciphering key in response to an access request from the request source apparatus, if the validity of the data access is confirmed by the enciphering key control part, wherein the authorization information received from the request source apparatus includes a unique code that is created from the enciphering key according to the arbitrary algorithm if an authentication is successful in the enciphering key management apparatus in response to an authentication request from the request source apparatus.

According to one aspect of the present invention, there is provided an authentication method comprising returning authorization information including a unique code created from an enciphering key according to an arbitrary algorithm to a request source apparatus of a data access, and sending enciphering key information including the enciphering key to a storage apparatus, if an authentication is successful in an enciphering key management apparatus in response to an authentication request from the request source apparatus; sending the authorization information from the request source apparatus to the storage apparatus; and judging and confirming a validity of the data access from the request source apparatus in the storage apparatus, based on the authorization information from the request source apparatus and authorization information that is created within the storage apparatus from the enciphering key within the enciphering key information received from the enciphering key management apparatus according to the arbitrary algorithm.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram for explaining an example of a structure of an enciphering key chain;

FIG. 6 is a diagram for explaining an example of a structure of an authorization information chain;

FIG. 7 is a flow chart for explaining a drive control process P1;

FIG. 8 is a flow chart for explaining an enciphering key management process P2;

DESCRIPTION OF EMBODIMENTS

Preferred embodiments of the present invention will be described with reference to the accompanying drawings.

According to one aspect of the present invention, the disclosed storage apparatus and authentication method returns authorization information that is created from an enciphering key according to an arbitrary algorithm to a request source apparatus of a data request, and sends enciphering key information that includes the enciphering key to the storage apparatus, if an authentication is successful in an enciphering key management apparatus, according to an authentication request from the request source apparatus. The request source apparatus sends the authorization information to the storage apparatus. The storage apparatus judges the validity of the data access from the request source apparatus in the storage apparatus based on the authorization information from the request source apparatus and the authorization information that is created within the storage apparatus from the enciphering key within the enciphering key information that is received from the enciphering key management apparatus.

If the validity of the data access is confirmed, the enciphering key is registered within the storage apparatus so that a data access using the registered enciphering key can be made with respect to a recording medium according to an access request from the request source apparatus.

The authentication between the request source apparatus and the enciphering key management apparatus and the authentication between the request source apparatus and the storage apparatus may be made using the authorization information issued from the enciphering key management apparatus. For this reason, the storage apparatus can authenticate users of the enciphering key without having to synchronize the setting of the enciphering key and the data accesses from the request source apparatuses, to thereby make it possible to secure security of the data accesses from the request source apparatuses.

A description will now be given of the storage apparatus and the authentication method in each embodiment according to the present invention.

Figure 1:
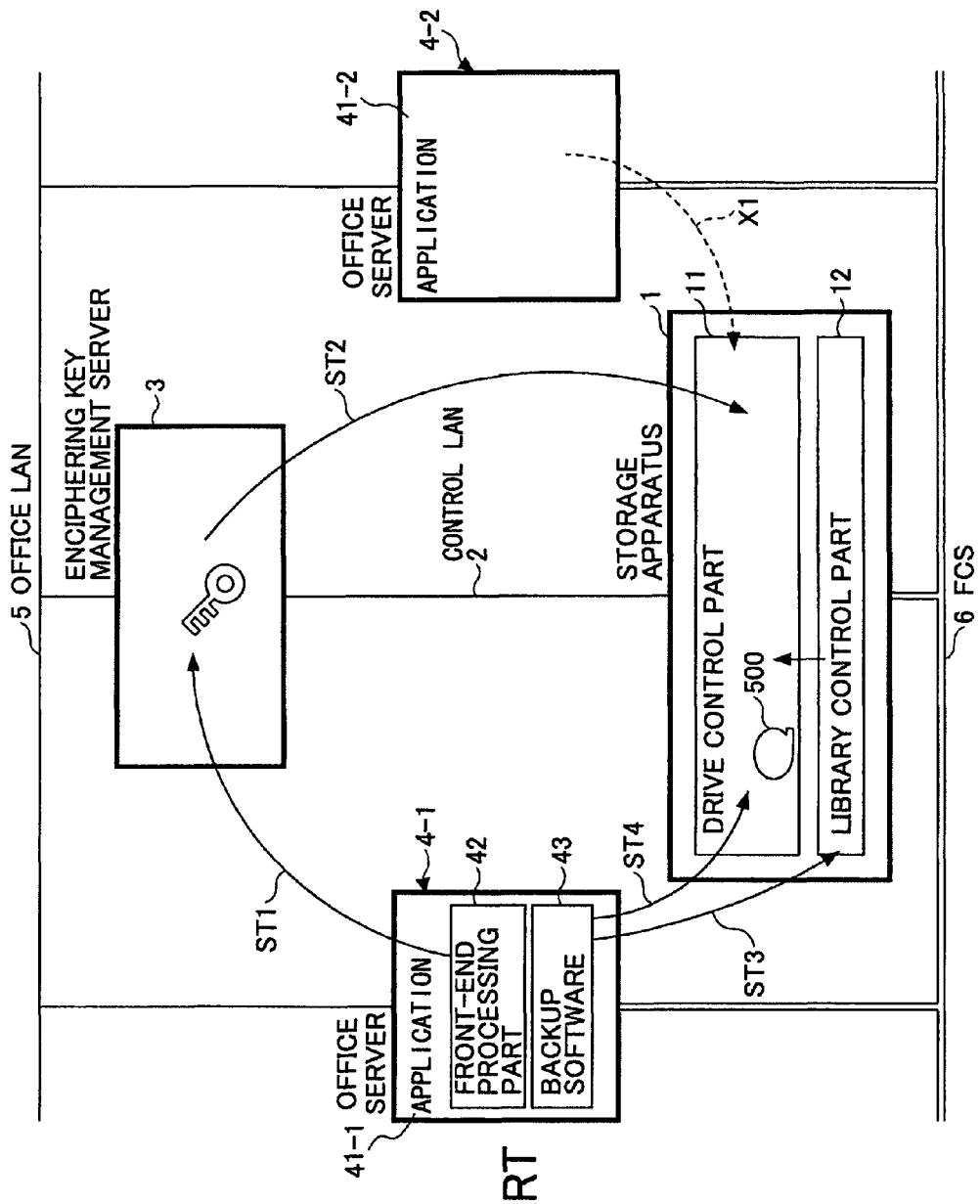
FIG. 1 is a block diagram for explaining an example of a conventional storage apparatus.
Figure 2:
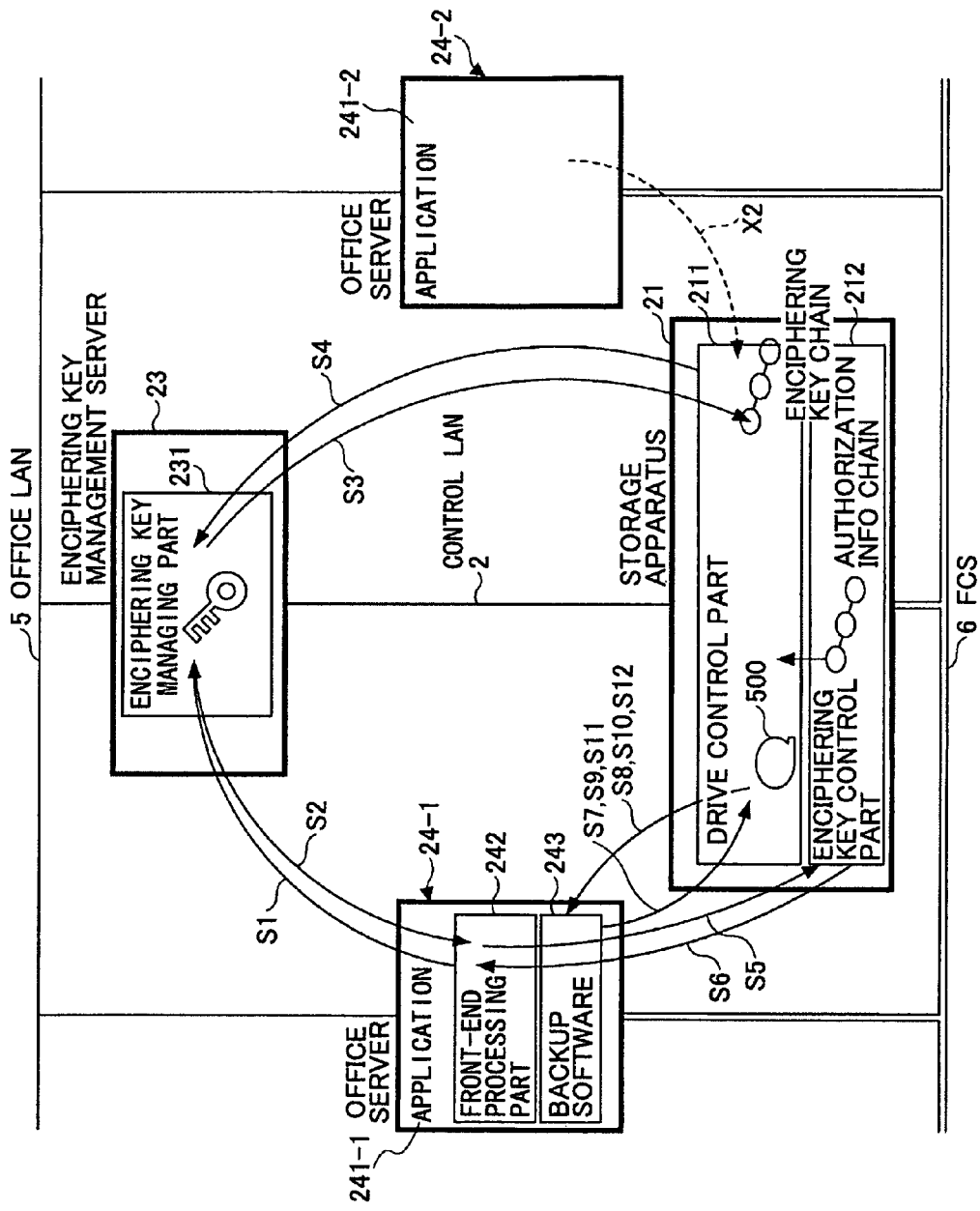
FIG. 2 is a block diagram for explaining an example of a storage apparatus in an embodiment of the present invention.

FIG. 2 is a block diagram for explaining an example of the storage apparatus in an embodiment of the present invention. In FIG. 2, those parts that are the same as those corresponding parts in FIG. 1 are designated by the same reference numerals, and a description thereof will be omitted.

A storage apparatus 21 illustrated in FIG. 2 is formed by a library apparatus that uses magnetic tape cartridges (hereinafter simply referred to as cartridges) 500, for example, and is connected to an enciphering key management server 23 via a control Local Area Network (LAN) 2. The enciphering key management server 23 forms the enciphering key management apparatus. The storage apparatus 21 includes a drive control part 211 and an enciphering key control part 212. A plurality of office servers (or midrange servers) 24-1 and 24-2 (only 2 office servers illustrated) are connected to the enciphering key management server 23 via an office LAN 5, and are also connected to the storage apparatus 21 via a Fiber Channel Switch (FCS) 6. An application 241-1 that is executable in the office server 24-1 includes a front-end processing part 242 and a backup software 243. An application 241-2 that is executable in the office server 24-2 includes a front-end processing part (not illustrated) and a backup software (not illustrated), similarly to the application 241-1 of the office server 24-1.

The storage apparatus 21 has an enciphering function, and each of the office servers 24-1 and 24-2 can make data accesses using the enciphering function of the storage apparatus 21. In other words, each of the office servers 24-1 and 24-2 can make a data write access in which data to be written to the cartridge 500 within the storage apparatus 21 is enciphered based on an enciphering key before being written, and a data read access in which the data read from the cartridge 500 is deciphered based on the enciphering key. The enciphering key management server 23 includes an enciphering key managing part 231 that manages the enciphering key that is used for an enciphering process or a deciphering process within the storage apparatus 21.

Figure 3:
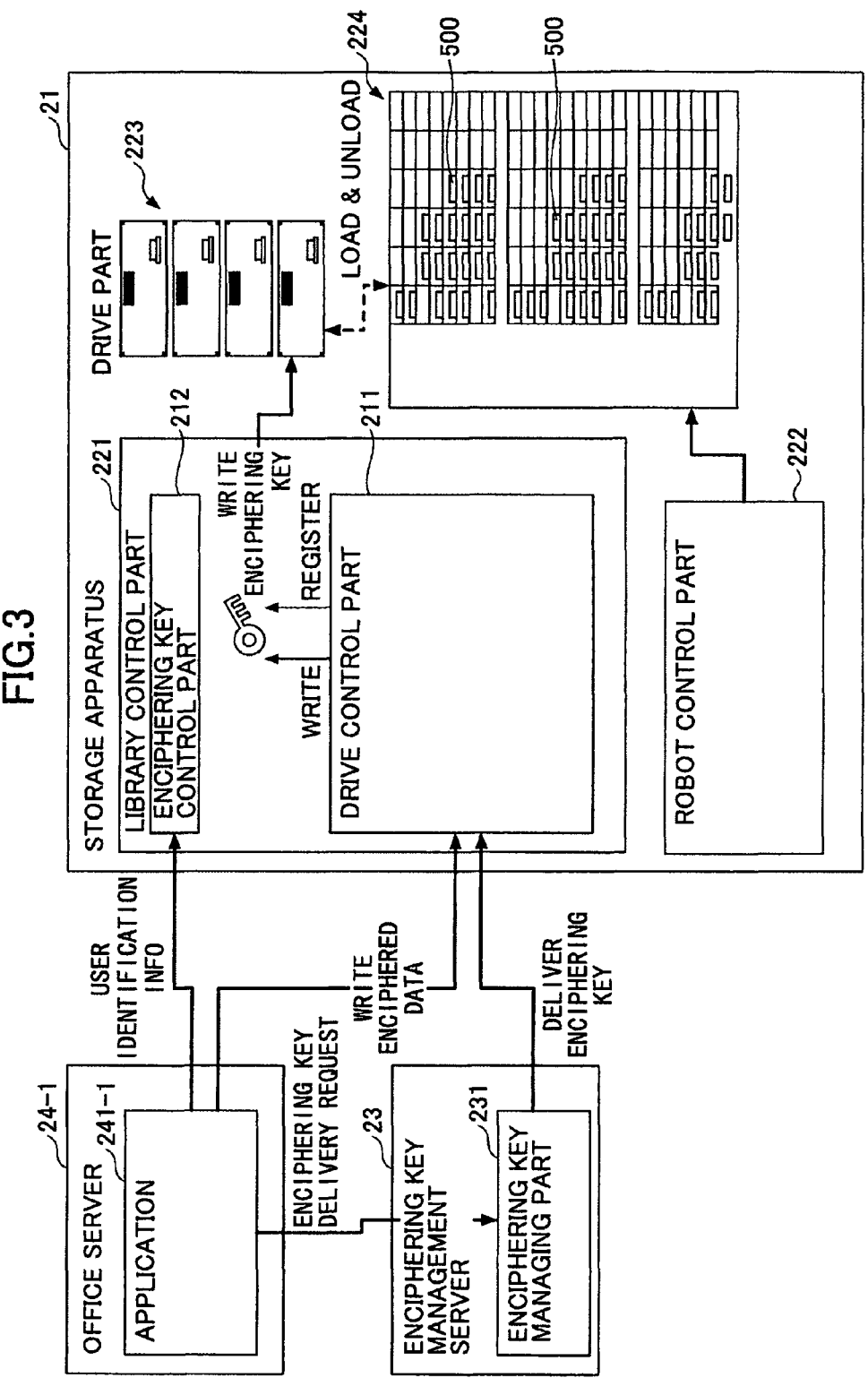
FIG. 3 is a diagram illustrating an example of a structure of the storage apparatus.

FIG. 3 is a diagram illustrating an example of a structure of the storage apparatus 21. In FIG. 3, a solid line arrow indicates a flow of instruction or data, and a phantom line arrow indicates an operation related to loading or unloading of the cartridge 500.

As illustrated in FIG. 3, the storage apparatus 21, includes a library control part 221, a robot control part 222, a drive part 223, and a rack (or locker) 224. The library control part 221 includes a drive control part 211, and an enciphering key control part 212 that manages the enciphering key delivered from the key management server 23. The drive control part 211 and the enciphering key control part 212 respectively denote functional blocks in FIG. 3, and may respectively be formed by software, for example. The robot control part 222 may be formed by a known firmware that performs a load operation in which the cartridge 500 accommodated within the rack 224 is obtained and loaded into the drive part 223, and an unload operation in which the loaded cartridge 500 in the drive part 223 is unloaded and accommodated within the rack 224. The drive part 223 has a known structure including a write and read unit (or write and read means) that writes data to a tape within the loaded cartridge 500, and reads written data from the tape within the loaded cartridge 500. A robot itself that is controlled by the robot control part 222 to perform the load and unload operations is known, and thus, the illustration and description of the robot and the structure of the robot will be omitted.

Although the cartridge 500 is used as an example of a recording medium, the recording medium is of course not limited to the magnetic tape cartridge, and it is possible to use other recording media, such as magnetic, optical and magneto-optical disks, and cartridges accommodating such other recording media. In addition, in a case where the drive part 223 has a structure that enables a plurality of different kinds of recording media, such as a magnetic tape and a magnetic tape, to be loaded to and unloaded from the drive part 223, the kind of recording media used in the storage apparatus 21 is not limited to a single kind of recording medium. In addition, a plurality of drive parts 223 configured to accept loading and unloading of mutually different kinds of recording media may be provided within the storage apparatus 21.

Figure 4:
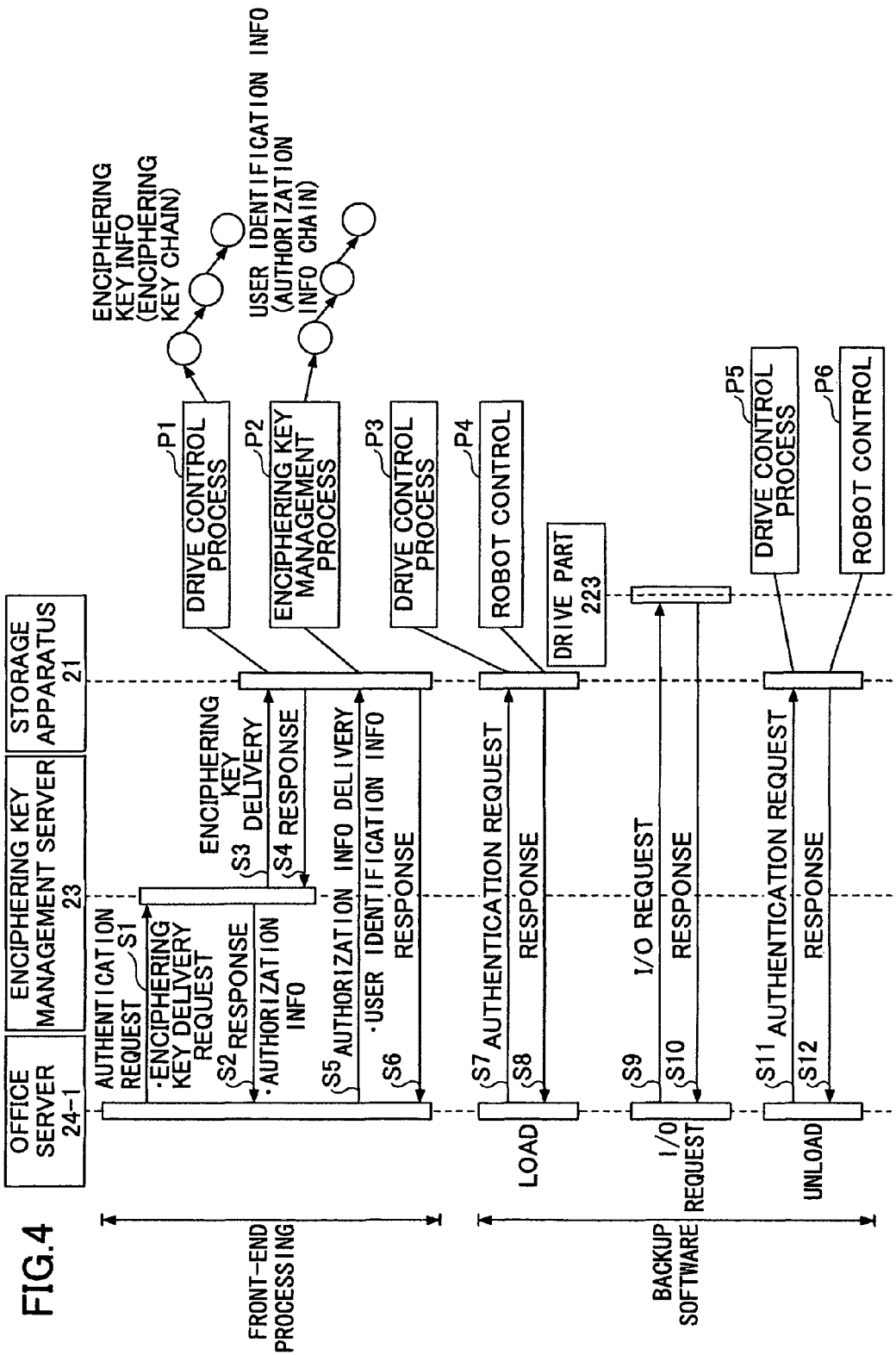
FIG. 4 is a time chart for explaining an operation of the storage apparatus.

FIG. 4 is a time chart for explaining an operation of the storage apparatus 21. A description will be given of a case where the office server 24-1, which forms a request source apparatus, makes a data access using the enciphering function of the storage apparatus 21. In FIG. 4, processes labeled "front-end process" indicate processes related to the front-end processing part 242, and processes labeled "backup software" indicate processes related to the backup software 243.

In a step S1 illustrated in FIG. 4, the front-end processing part 242 of the application 24-1 makes an authentication request, including an enciphering key delivery request, with respect to the enciphering key management server 23. The enciphering key delivery request includes a user identifier (ID) of the application 241-1 of the office server 24-1, and enciphering key specifying information, such as a volume name of the cartridge 500, for specifying the enciphering key. In a step S2, the enciphering key managing part 231 of the enciphering key management server 23 authenticates the authentication request from the application 241-1, and returns a response confirming the authentication to the front-end processing part 242 of the office server 24-1 if the authentication is successful. This response confirming the authentication includes the user identifier (ID) and authorization information. The authorization information returned to the office server 24-1 is a unique code that is created from the enciphering key by the enciphering key managing part 231. In addition, in order to prevent the authorization information from being tapped between the key management server 23 and the office server 24-1, it is desirable that a channel between the key management server 23 and the office server 24-1 is made secure by a technique such as the Secure SHell (SSH). In a step S3, the enciphering key managing part 231 of the enciphering key management server 23 delivers the enciphering key information to the drive control part 211 of the storage apparatus 21 if the authentication described above is successful. The enciphering key information delivered to the drive control part 211 of the storage apparatus 21 includes, in addition to the enciphering key, the user identifier (ID) and the enciphering key specifying information, such as the volume name of the cartridge 500, for specifying the enciphering key. The order in which the steps S1, S2 and S3 are executed is not limited to a particular order, and the steps S1, S2 and S3 may be executed in parallel.

In a step S4, the drive control part 211 of the storage apparatus 21 that receives the enciphering key executes a drive control process P1. In this drive control process P1, the enciphering key information including the user identifier (ID), the enciphering key specifying information, such as a volume name of the cartridge 500, for specifying the enciphering key, the unique code (authorization information) created from the enciphering key, and the enciphering key (enciphering key data) is queued into an enciphering key chain, and enciphering key reception information, that is, a response confirming receipt of the enciphering key, is returned to the enciphering key managing part 231 of the enciphering key management server 23. An algorithm that is used by the drive control part 211 to create the authorization information from the enciphering key of the enciphering key information is the same as the algorithm that is used by the enciphering key managing part 231 of the enciphering key management server 23 to create the authorization information from the enciphering key. However, the algorithm itself is not limited to a particular algorithm, and the authorization information may be created according to an arbitrary algorithm.

FIG. 5 is a diagram for explaining an example of a structure of the enciphering key chain. The enciphering key information of the enciphering key chain includes a next pointer indicating a position within the library control part 221 (for example, a memory address within the storage apparatus 21) where a next enciphering key is stored, a back pointer indicating a position within the library control part 221 where an immediately preceding enciphering key (or previous enciphering key) is stored, the user identifier (ID), the enciphering key specifying information, the authorization information that is created according to the arbitrary algorithm from the enciphering key within the enciphering key information received from the enciphering key management server 23, and the enciphering key (enciphering key data).

In a step S5, the front-end processing part 242 of the application 241-1 delivers to the enciphering key control part 212 of the storage apparatus 21 a user identification information including the user identifier (ID) of the application 24-1, the authorization information, and apparatus information, such as a World Wide Name (WWN), for specifying the request source (office server 24-1 in this example) which issues an Input and Output (I/O) request. In a step S6, the enciphering key control part 212 of the storage apparatus 21 executes an enciphering key management process P2. In this enciphering key management process P2, the user identification information is queued into an authorization information chain, and a response confirming receipt of the authorization information is returned to the front-end processing part 242 of the application 241-1 of the office server 24-1.

FIG. 6 is a diagram for explaining an example of a structure of the authorization information chain. The user identification information of the authorization information chain includes a next pointer that indicates a position within the library control part 221 (for example, a memory address within the storage apparatus 21) where the next user identifier (ID) is stored, a back pointer that indicates a position within the library control part 221 where an immediately preceding user identifier (ID) (or previous user identifier (ID)) is stored, the user identifier (ID), the authorization information, and the WWN.

Accordingly, the storage apparatus 21 manages the order of the requests for the plurality of enciphering keys by the enciphering key chain, and manages the unique code (authorization information) that is created from the enciphering key by the authorization information chain, in order to conceal the enciphering keys with respect to apparatuses that are provided externally to the storage apparatus 21.

In a step S7, the backup software 243 of the application 241-1 makes an authentication request, including a load request and a reserve request, with respect to the drive control part 211 of the storage apparatus 21. The drive control part 211 of the storage part 21 executes a drive control process P3 in response to the load request and the reserve request. The drive control process P3 acquires the user identification information corresponding to the WWN of the request source included in the load request, from the authorization information chain that is managed by the enciphering key control part 212. In addition, the drive control process P3 acquires from the enciphering key chain that is managed by the drive control part 211 an enciphering key with a user identifier (ID) and authorization information (unique code) matching the user identifier (ID) and the authorization information (unique code) of the user identification information that is acquired from the authorization information chain, if any, and removes (or deletes) the enciphering key information including the acquired enciphering key from the enciphering key chain. Furthermore, the drive control process P3 registers (or sets) the enciphering key that is removed from the enciphering key chain into the drive part 223 in order to set (or reserve) a data path with respect to the drive control part 211 in response to the reserve request.

On the other hand, the robot control part 222 of the storage part 21 executes a robot control P4 to obtain the cartridge 500 corresponding to the access address included in the load request from the rack 224, and to load the obtained cartridge 500 into the drive part 223. When the cartridge 500 is loaded into the drive part 223, the drive control part 211 returns a response with respect to the authentication request including the load request with respect to the backup software 243 of the application 241-1 of the office server 24-1, in a step S8. As a result, the backup software 243 of the application 241-1 assumes a state where the backup software 243 can write data to or read data from the loaded cartridge 500 within the drive part 223 by making an Input and Output (I/O) request, such as a write request or a read request, with respect to the storage apparatus 21.

In a step S9, the backup software 243 of the application 241-1 makes an I/O request, such as a write request or a read request) with respect to the storage apparatus 21. In the case of the write request, the data sent to the storage apparatus 21 is enciphered using the enciphering key that is registered in the drive part 223 under the control of the drive control part 211, and the enciphered data is written to the tape within the loaded cartridge 500. On the other hand, in the case of the read request, the data read from the tape within the loaded cartridge 500 is deciphered using the enciphering key that is registered in the drive part 223 under the control of the drive control part 211, and the deciphered data is sent to the office server 24-1. In a step S10, the drive control part 211 of the storage apparatus 21 returns a response with respect to the I/O request to the backup software 243 of the application 241-1. In the case of the write request, the response returned to the backup software 243 includes a write complete report. In the case of the read request, the response returned to the backup software 243 includes a read complete report and the data read from the cartridge 500.

In a step S11, the backup software 243 of the application 241-1 makes an authentication request, including an unload request and a data path release request (hereinafter simply referred to as a release request), with respect to the drive control part 211 of the storage apparatus 21. The drive control part 211 of the storage apparatus 21 executes a drive control process P5 in response to the unload request and the release request. The drive control process P5 acquires the user identification information corresponding to the WWN of the request source included in the unload request, from the authorization information chain managed by the enciphering key control part 212. In addition, the drive control process P5 deletes (or resets) an enciphering key that is registered (or set) in the drive part 223 and has a user identifier (ID) and authorization information (unique code) matching the user identifier (ID) and the authorization information (unique code) of the user identification information that is acquired from the authorization information chain, if any, in order to release the data path respect to the drive control part 211.

On the other hand, the robot control part 222 of the storage apparatus 21 executes a robot control P6 to unload the cartridge 500 corresponding to the access address included in the load request from the drive part 223, and to accommodate the unloaded cartridge 500 within the rack 224. When the cartridge 500 is accommodated within the rack 224, the drive control part 211 returns a response with respect to the authentication request including the load request with respect to the backup software 243 of the application 241-1 of the office server 24-1, in a step S12. As a result, the backup software 243 of the application 241-1 assumes a state where the backup software 243 can execute the step S1 described above.

In the case of the storage apparatus 21, the data access from the office server 24-1 and the data access from the office server 24-2 are not synchronized to each other. For this reason, after the cartridge 500 is loaded into the drive part 223 based on the authentication request from the office server 24-1 and the enciphering key is registered in the drive part 223 in the step S7, an apparatus other than the office server 24-1 that originally made the enciphering key delivery request, such as the office server 24-2, may generate the authentication request as indicated by a phantom arrow X2 in FIG. 2. However, even when the office server 24-2 makes the authentication request in the step S1, if the office server 24-2 does not deliver the authorization information in the step S5, the storage apparatus 21 cannot acquire the correct user identifier (ID) with respect to the enciphering key. Consequently, the authentication request from the office server 24-2 will be unsuccessful, and a data access with respect to the cartridge 500 loaded into, the drive part 223 cannot be made using the enciphering key even if the enciphering key is registered in the drive part 223. In other words, the access request from the office server 24-1 using the enciphering key registered in the drive part 223 is rejected by the library control part 221 of the storage apparatus 21, and it is possible to secure the security of the data.

As described above, not only the authentication between the application 241-1 of the office server 24-1 and the key management server 23 but also the authentication between the application 241-1 and the storage apparatus 21 can be made using the authorization information that is issued from the key management server 23. For this reason, the storage apparatus 21 can collate and check the user of the enciphering key without having to synchronize the data accesses in the storage apparatus 21, and it is possible to prevent an unauthorized data access or, an erroneous data access from the office server 24-2, for example, with respect to the cartridge 500 that is loaded in the drive part 223 in which the enciphering key is registered. Further, it is possible to confirm the validity of the cartridge 500 that is loaded into the drive part 223 by using the authorization information that is created in accordance with the arbitrary algorithm from the enciphering key within the enciphering key information received from the enciphering key management server 23.

Next, a more detailed description will be given of the processes P1 through P3 and P5 illustrated in FIG. 4, by referring to FIGS. 7 through 10.

FIG. 7 is a flow chart for explaining the drive control process P1 of the drive control part 211 of the storage apparatus 21. A step P1-1 decides whether the data received from the enciphering key management server 23 is the enciphering key. If the decision result in the step P1-1 is YES, a step P1-2 creates the authorization information from the enciphering key within the enciphering key information received from the enciphering key management server 23 according to the arbitrary algorithm, and performs an enciphering key chain process that causes the enciphering key information including the enciphering key and the authorization information to be queued into the enciphering key chain. The step P1-2 further returns the enciphering key reception information, that is, the response confirming receipt of the enciphering key, to the enciphering key managing part 231 of the enciphering key management server 23. The drive control process P1 ends after the step P1-2 or, if the decision result in the step P1-1 is NO.

FIG. 8 is a flow chart for explaining the enciphering key management process P2 of the enciphering key control part 212 of the storage apparatus 21. A step P2-1 decides whether the data received from the office server 24-1 is the user identification information. The user identification includes the user identifier (ID), the authorization information, and the WWN. If the decision result in the step P2-1 is YES, a step P2-2 performs an authorization information chain process that causes the user identification information to be queued into the authorization information chain, and returns the response confirming receipt of the authorization information to the front-end processing part 242 of the application 241-1 of the office server 24-1. The enciphering key management process P2 ends after the step P2-2 or, if the decision result in the step P2-1 is NO.

Figure 9:
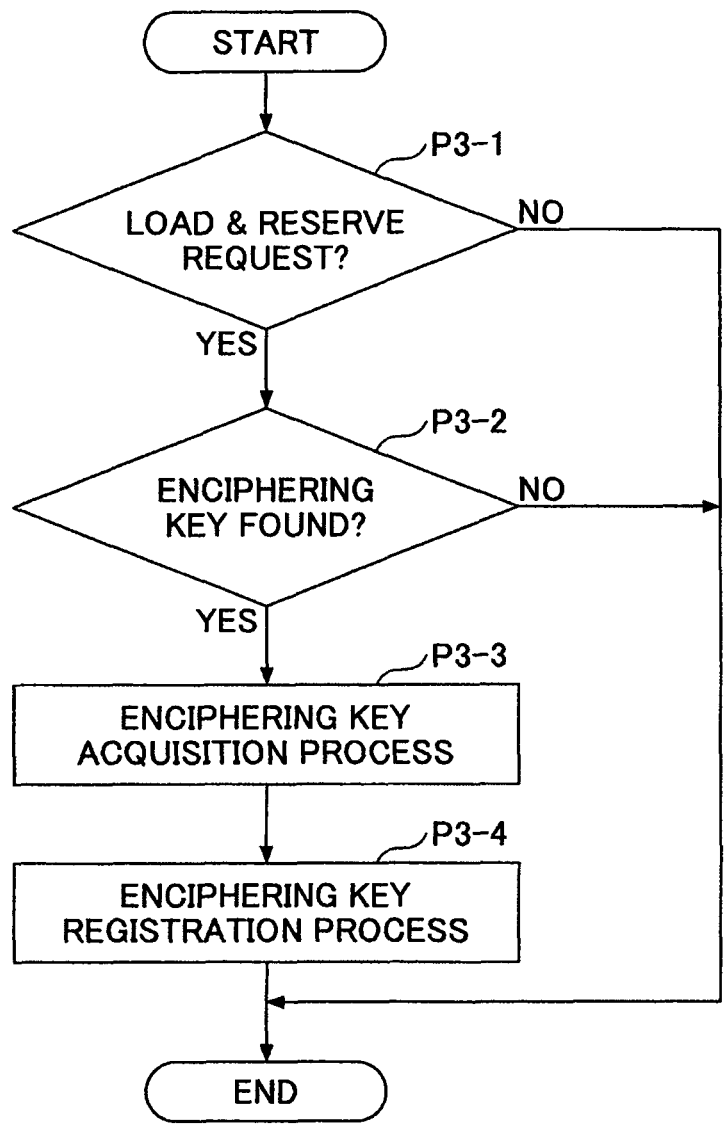
FIG. 9 is a flow chart for explaining a drive control process P3.

FIG. 9 is a flow chart for explaining the drive control process P3 of the drive control part 211 of the storage part 21. A step P3-1 decides whether the received request is the authentication request including the load request and the reserve request. The drive control process P3 ends if the decision result in the step P3-1 is NO, but the process advances to a step P3-2 if the decision result in the step P3-1 is YES. The step P3-2 acquires the user identification information corresponding to the WWN of the request source included in the load request, from the authorization information chain that is managed by the enciphering key control part 212, using the WWN as a search index (or search key). In addition, the step P3-2 decides whether the enciphering key with the user identifier (ID) and the authorization information (unique code) matching the user identifier (ID) and the authorization information (unique code) of the user identification information that is acquired from the authorization information chain, can be found in the enciphering key chain that is managed by the drive control part 211. The drive control process P3 ends if the decision result in the step P3-2 is NO, but the process advances to a step P3-3 if the decision result in the step P3-2 is YES. The step P3-3 performs an enciphering key acquisition process that acquires the enciphering key with the user identifier (ID) and the authorization information (unique code) matching the user identifier (ID) and the authorization information (unique code) of the user identification information that is acquired from the authorization information chain, from the enciphering key chain that is managed by the drive control part 211, and removes (or deletes) the enciphering key information including the acquired enciphering key from the enciphering key chain. A step P3-4 performs an enciphering key registration process that registers (or sets) the enciphering key that is removed from the enciphering key chain into the drive part 223 in order to set (or reserve) the data path with respect to the drive control part 211 in response to the reserve request, and the drive control process P3 ends.

Figure 10:
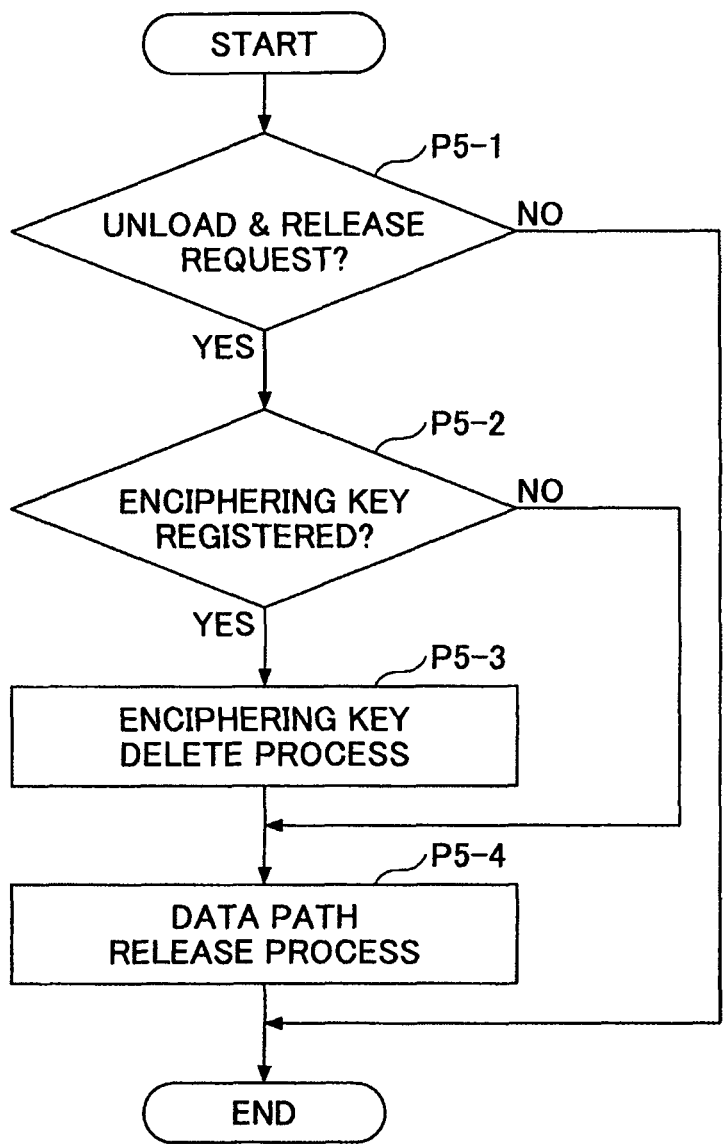
FIG. 10 is a flow chart for explaining a drive control process P5.

FIG. 10 is a flow chart for explaining the drive control process P5 of the drive control part 211 of the storage apparatus 21. A step P5-1 decides whether the received request is the authentication request including the unload request and the release request. The drive control process P5 ends if the decision result in the step P5-1 is NO, but the process advances to a step P5-2 if the decision result in the step P5-1 is YES. The step P5-2 acquires the user identification information corresponding to the WWN of the request source included in the unload request, from the authorization information chain managed by the enciphering key control part 212, using the WWN as a search index (or search key). In addition, the step P5-2 decides whether the enciphering key, having the user identifier (ID) and authorization information (unique code) matching the user identifier (ID) and the authorization information (unique code) of the user identification information that is acquired from the authorization information chain, is registered (or set) in the drive part 223. The process advances to a step P5-3 if the decision result in the step P5-2 is YES, but the process advances to a step P5-4 if the decision result in the step P5-2 is NO. The step P5-3 performs an enciphering key delete process that deletes (or resets) the enciphering key that is registered (or set) in the drive part 223 and has the user identifier (ID) and authorization information (unique code) matching the user identifier (ID) and the authorization information (unique code) of the user identification information that is acquired from the authorization information chain. After the step P5-3 or if the decision result in the step P5-2 is NO, the step P5-4 performs a data path release process that releases the data path respect to the drive control part 211, and the drive control process P5 ends.

If no I/O request is received from the office server 24-1 for a predetermined time after the load request or the reserve request, the loaded cartridge 500 within the drive part 223 may be automatically unloaded and accommodated within the rack 224 under the control of the robot control part 222. In this case, the enciphering key registered in the drive part 223 may be deleted with the unloading of the loaded cartridge 500 within the drive part 223.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
a drive unit to which a recording medium that is an access target is loaded, and from which the recording medium is unloaded; and
a processor configured to execute an operation including:
confirming a validity of a data access from a request source apparatus based on authorization information that is received from the request source apparatus and authorization information that is created from an enciphering key included in enciphering key information received from an enciphering key management apparatus, according to an arbitrary algorithm; and
making the data access with respect to the recording medium that is loaded into the drive unit using the enciphering key in response to an access request from the request source apparatus when the validity of the data access is confirmed,
wherein the authorization information received from the request source apparatus includes a unique code that is created from the enciphering key according to the arbitrary algorithm when an authentication in the enciphering key management apparatus in response to an authentication request from the request source apparatus is successful, and wherein the enciphering key information received from the enciphering key management apparatus includes a user identifier of the request source apparatus, enciphering key specifying information that specifies the enciphering key, the authorization information, and the enciphering key, and
the operation includes:
causing the enciphering key information to be queued into an enciphering key chain; and
receiving, from the request source apparatus user identification information including a user identifier, the authorization information, and apparatus information that specifies the request source apparatus, and to cause the user identification information to be queued into an authorization information chain.

2. The storage apparatus as claimed in claim 1, wherein the operation:
acquires, from the authorization information chain, the user identification information corresponding to the apparatus information of the request source apparatus and included in a load request from the request source apparatus;
acquires, from the enciphering key chain, enciphering key information that includes a user identifier and authorization information respectively matching the user identifier and the authorization information of the user identification information that is acquired from the authorization information chain, and removes the enciphering key information including the acquired enciphering key from the enciphering key chain; and
registers the enciphering key information that is removed from the enciphering key chain into the drive unit in order to set a data path with respect to the drive unit in response to a reserve request.

3. The storage apparatus as claimed in claim 2, wherein the operation:
acquires, from the authorization information chain, the user identification information corresponding to the apparatus information of the request source apparatus and included in an unload request from the request source apparatus; and
deletes enciphering key information that is registered in the drive unit and includes a user identifier and authorization information matching the user identifier and the authorization information of the user identification information that is acquired from the authorization information chain, if any, in order to release the data path respect to the drive unit.

4. The storage apparatus as claimed in claim 1, comprising:
a rack configured to accommodate a plurality of recording media,
wherein a recording medium corresponding to user information included in a load request from the request source apparatus is obtained from the rack and loaded into the drive unit, and the recording medium corresponding to user information included in an unload request from the request source apparatus is unladed from the drive unit and accommodated within the rack.

5. The storage apparatus as claimed in claim 1, wherein
the drive unit includes a write and read unit configured to write data to the recording medium that is loaded within the drive unit and to read data from the recording medium that is loaded within the drive unit, and
the data access includes a data write access in which the data is enciphered based on the enciphering key registered in the drive unit before being written to the recording medium, and a data read access in which the data read from the recording medium is deciphered based on the enciphering key registered in the drive unit.

6. An authentication method comprising:
returning authorization information including a unique code created from an enciphering key according to an arbitrary algorithm to a request source apparatus of a data access, and sending enciphering key information including the enciphering key to a storage apparatus, when an authentication performed in an enciphering key management apparatus in response to an authentication request from the request source apparatus is successful;
sending the authorization information from the request source apparatus to the storage apparatus; and
confirming a validity of the data access from the request source apparatus in the storage apparatus, based on the authorization information from the request source apparatus and authorization information that is created within the storage apparatus from the enciphering key within the enciphering key information received from the enciphering key management apparatus according to the arbitrary algorithm,
registering the enciphering key within the storage apparatus when the validity of the data access is confirmed by the confirming, and making the data access with respect to a recording medium using the enciphering key in response to an access request from the request source apparatus, and
wherein the enciphering key information received by the storage apparatus from the enciphering key management apparatus includes a user identifier of the request source apparatus, enciphering key specifying information that specifies the enciphering key, the authorization information, and the enciphering key; and the authentication method further comprises:
  causing the enciphering key information received by the storage apparatus to be queued into an enciphering key chain in the storage apparatus;
  delivering from the request source apparatus user identification information including the user identifier, the authorization information, and apparatus information that specifies the request source apparatus; and
  causing the user identification information received by the storage apparatus to be queued into an authorization information chain in the storage apparatus.

7. The authentication method as claimed in claim 6, further comprising:
  acquiring, in the storage apparatus, from the authorization information chain, the user identification information corresponding to the apparatus information of the request source apparatus and included in a load request from the request source apparatus;
  acquiring, in the storage apparatus, from the enciphering key chain, enciphering key information that includes a user identifier and authorization information respectively matching the user identifier and the authorization information of the user identification information that is acquired from the authorization information chain, and removing the enciphering key information including the acquired enciphering key from the enciphering key chain; and
  registering, in the storage apparatus, the enciphering key information that is removed from the enciphering key chain in order to set a data path in response to a reserve request.

8. The authentication method as claimed in claim 7, further comprising:
  acquiring, in the storage apparatus, from the authorization information chain, the user identification information corresponding to the apparatus information of the request source apparatus and included in an unload request from the request source apparatus; and
  deleting, in the storage apparatus, enciphering key information that is registered and includes a user identifier and authorization information respectively matching the user identifier and the authorization information of the user identification information that is acquired from the authorization information chain, in order to release the data path.

9. The authentication method as claimed in claim 6, wherein the data access includes a data write access in which the data is enciphered based on the enciphering key that is registered before being written to the recording medium, and a data read access in which the data read from the recording medium is deciphered based on the enciphering key that is registered.

* * * * *